Jan. 19, 1965    H. J. BRYAN    3,166,129
DUAL THRUST PROPELLER AND CONTROLS FOR ROTARY WINGED AIRCRAFT
Filed Feb. 27, 1961    3 Sheets-Sheet 1

INVENTOR.
BY Harvard J. Bryan

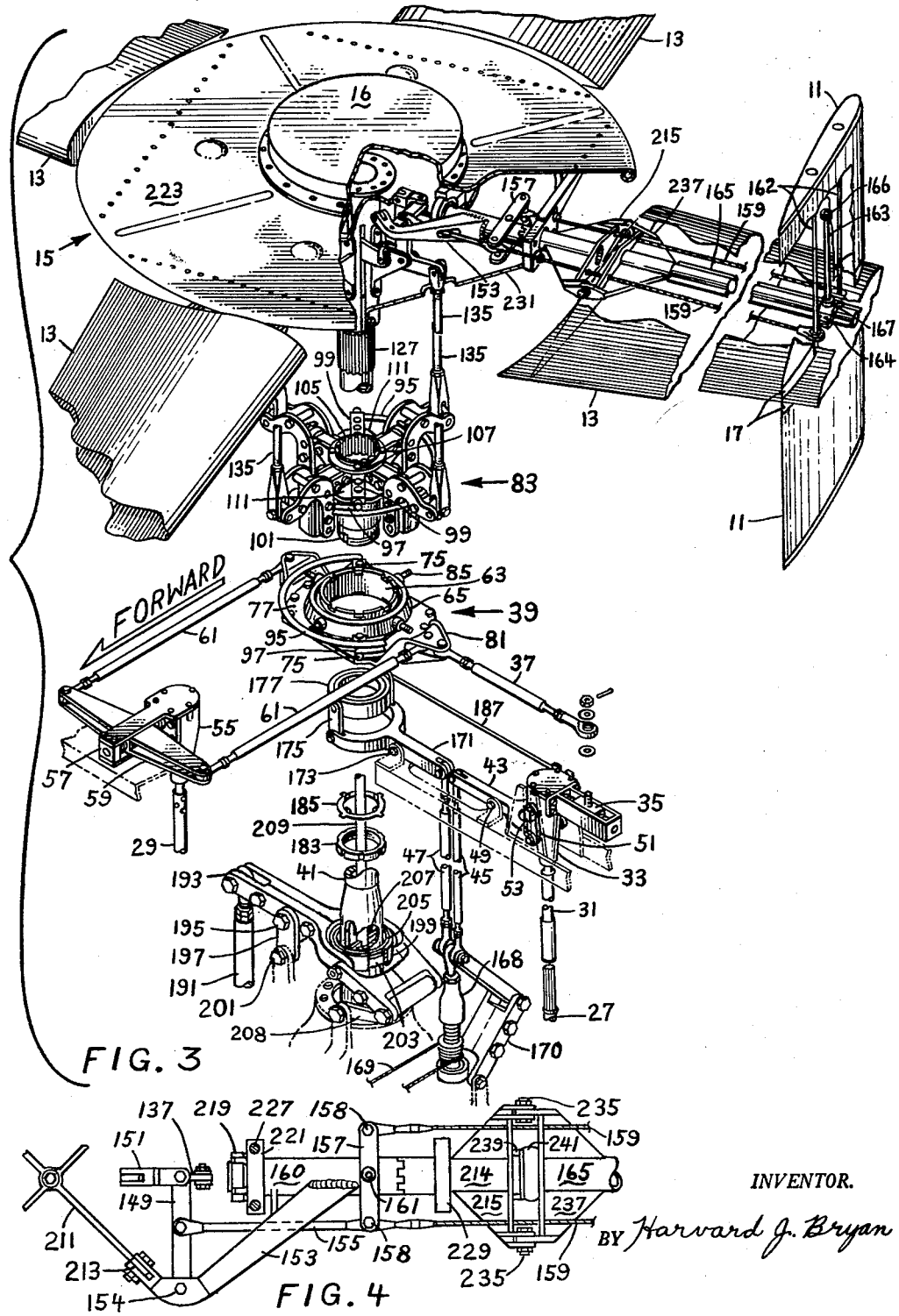

Jan. 19, 1965     H. J. BRYAN     3,166,129
DUAL THRUST PROPELLER AND CONTROLS FOR ROTARY WINGED AIRCRAFT
Filed Feb. 27, 1961     3 Sheets-Sheet 3

INVENTOR.

BY *Harvard J. Bryan*

United States Patent Office 3,166,129
Patented Jan. 19, 1965

3,166,129
DUAL THRUST PROPELLER AND CONTROLS FOR ROTARY WINGED AIRCRAFT
Harvard J. Bryan, 9303 Sorrento, Dallas 28, Tex.
Filed Feb. 27, 1961, Ser. No. 93,830
1 Claim. (Cl. 170—160.25)

This invention relates to rotary winged aircraft and more particularly to improvements in rotor and control systems. This system will produce thrust in line with the axis of rotation of the rotor blades and also perpendicular thereto in any selected direction.

In the presently disclosed embodiment of this invention (Duo-Prop), thrust, perpendicular to the axis of rotation of the rotor blades, is accomplished as follows:

The horizontally disposed lift rotor blades have thrust providing, vertically disposed, fins mounted thereon in a manner to permit pivoting about their substantially vertical axes. Below the rotor blade mounting hub a fin control mechanism is employed. Push-pull rods connect the rotatable portion of the fin control mechanism to bellcranks in the rotor hub. When the fin control mechanism is held in a neutral position, there is no movement of the thrust fins relative to the rotor blades. If, however, the fin control mechanism is actuated for fin cyclic feather, a tilted plane of rotation relative to the axis of rotation of the rotor blades is created, causing the push-pull rods to move up and down as they traverse the tilted plane of rotation. The push-pull action parallel to the axis of rotation of the rotor blades is translated into a push-pull action perpendicular to the axis of rotation of the rotor blades by bell-cranks in the rotor hub; and by linkage to the fins, cyclic feather of the fins is accomplished, creating thrust perpendicular to the axis of rotation of the rotor blades in any selected direction, thus providing horizontal thrust and directional control.

When vertical lift, or hover, is desired with no horizontal flight, said fins may be kept in neutral positions with zero angles of attack as they rotate, or they may be collectively controlled so that they are all positioned to force air inwardly toward the axis of rotation of the rotor blades thereby increasing lift by providing a ducting effect of the rotor blades and restricting dispersal of air, thus increasing the volume of air which is forced downward by the rotor blades. Said fins may be all positioned to force air outwardly away from the axis of rotation of the rotor blades thereby dispersing the air and decreasing lift by decreasing the volume of air which is forced downward by the rotor blades permitting descent of the aircraft without changing rotor blade collective pitch or decreasing power.

Heretofore, none of the inventions relating to flying apparatus employing fins mounted on members extending radially from the axis of rotation have employed both cyclic and collective control of the angles of incidence of the fins and none of the prior art employs the large disc surrounding the rotor hub for the same purpose as taught in this invention. The disc shaped enclosure of this rotor hub is designed to prevent undesirable upward flow of air between inward ends of the rotor blades and is to specifically occupy an equivalent to the area occupied by the inefficient inward end portion of the rotor blades of helicopters as now commonly known.

It should be understood here that the plane of rotation of the rotor blades of this invention does not tilt to produce horizontal movement as in the helicopters that employ cyclic pitch of the rotor blades for horizontal thrust. This fact permits the use of said disc on this invention but makes it impractical to use such a disc on helicopters employing cyclic pitch of the rotor blades because the disc when tilted causes prohibitive drag.

An object of this invention is to provide an improved rotor and control system for rotary winged aircraft that has good autorotation characteristics, that eliminates the need for lift rotor cyclic pitch, and is inherently free of lift rotor cyclic pitch vibration which is undesirable in helicopters.

A further object of this invention is to provide a rotor and control system for rotary winged aircraft that does not of necessity have rotor blades fully articulated and thereby eliminates the use of expensive parts necessary to have rotor blades fully articulated.

A further object of this invention is to provide a rotor and control system that will have better productibility and maintenance characteristics than conventional helicopter rotor and control systems.

A further object of this invention is to provide a rotor and control system that will more favorably accommodate and render more effective exhaust ports, ram jets, or other means of thrust located on the rotor blades, if that type of power should be chosen, and this is possible because the absence of cyclic pitch in the rotor blades of this invention allows blade outer tips to rotate substantially in a common plane in all regimes of flight, contrary to the exaggerated up and down rotational path of blade outer tips of similarly powered conventional helicopters when cyclic pitch is employed.

A further object of this invention is to provide a rotor and control system for rotary winged aircraft inherently capable of greater speed and greater lift per horsepower than is possible with helicopters that do not employ vertically disposed fins on the rotor blades.

A feature of this invention is that this basic rotor and control system can be designed to accomodate any desired number of rotor blades and thrust fins.

Another feature of this invention is that rotor blade life will be longer due to the absence of rotor blade cyclic pitch and the flexing that cyclic pitch causes.

Another feature of this invention is that rotor blades may be folded downward for mooring, removal, or attaching.

Only the rotor and controls system and the new mechanisms and principles as taught in this application are claimed as new. It should be understood that an aircraft configuration employing two rotors of this type is better for high speed flight and that the aircraft body configuration shown is for illustration purposes only and is not claimed as new. Single rotored aircraft configurations employing this rotor and controls system are better for operations requiring extremely accurate control of the aircraft at low speeds such as setting church steeples in place.

The commonly known helicopter maneuvers horizontally by actuating cyclic pitch of the lift rotor blades thus unbalancing lift to induce movement. This causes aircraft to swing from rotors like a pendulum, making accurate movement difficult.

Other objects and a fuller understanding of the invention may be had by referring to the following description and claims, taken in conjunction with the accompanying drawings in which:

FIGURE 3 is a perspective exploded view of the rotors and controls, in part fragmentary, with the major components separated from each other and with portions broken away to show inside details.

FIGURE 4 is a partial plan view of rotor blade and fin controls in the rotor hub.

Figure 1:
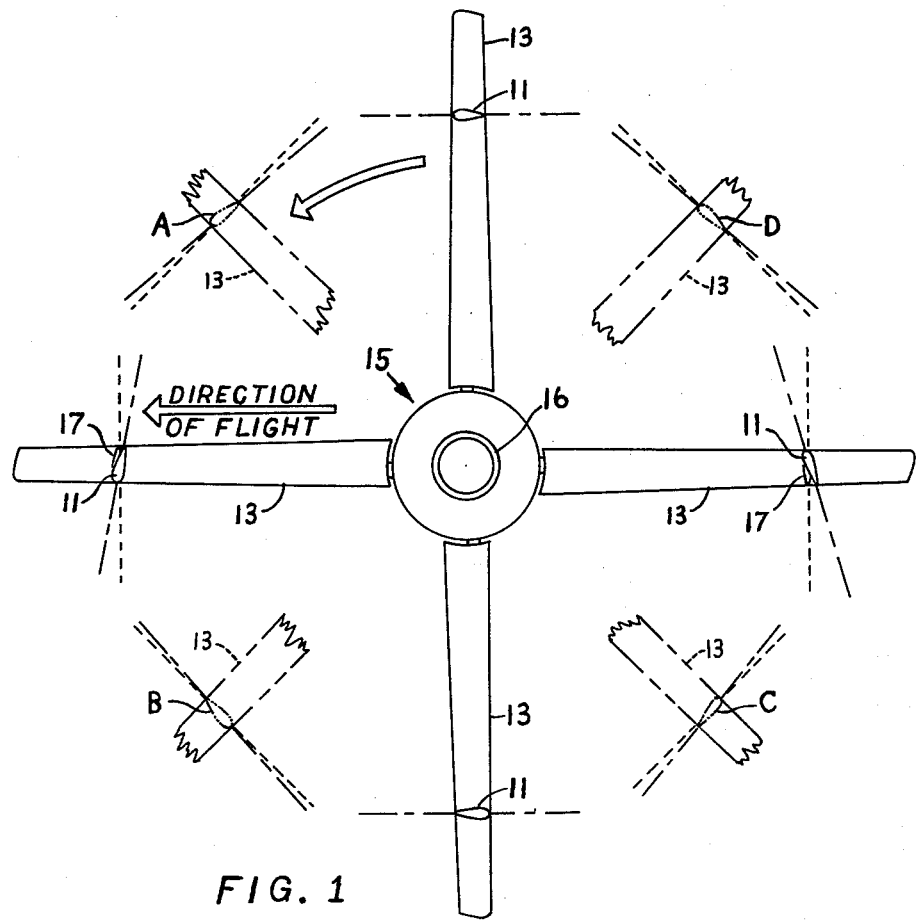
FIGURE 1 is a plan view of the rotor system showing fins on the rotor blades cyclicly actuated to create thrust approximately in the direction indicated by straight arrow, and, in broken lines, portions of the rotor blades and fins are shown rotated forty-five degrees counterclockwise.
Figure 2:
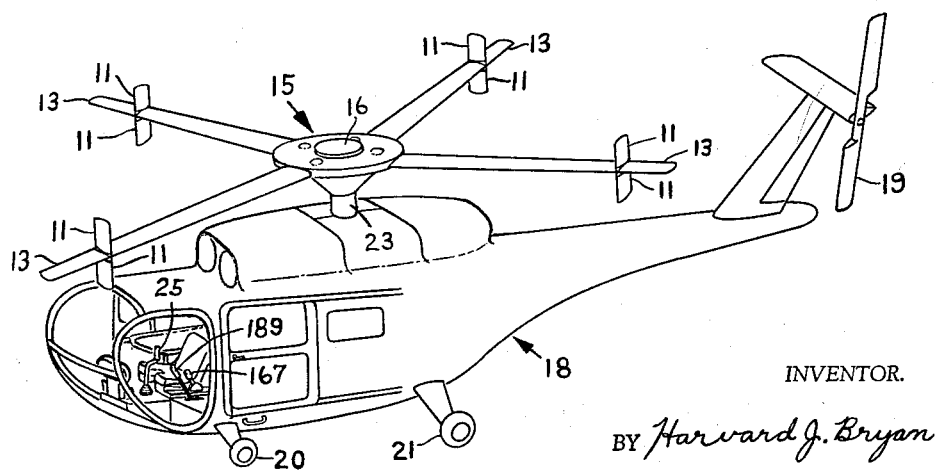
FIGURE 2 is a perspective view of a typical rotary winged aircraft showing the presently preferred rotor system with thrust fins on rotor blades shown in neutral positions.

Referring now to FIGURE 1, the rotor fins 11, of which there are identical fins above and below the rotor blades 13, are pivotally attached to said rotor blade 13 and are shown actuated to change their angles of incidence in a cyclic manner during rotation of the rotor to create thrust approximately in the direction indicated by the straight arrow labeled "Direction of Flight." Direction of flight is given as approximate because even though the immediate results of actuation for cyclic feather of said fins would create thrust in the direction indicated by arrow, the direction of thrust and hence direction of flight relative to the fin cyclic feather setting would vary with varying horizontal speed due chiefly to drag increase on rotor blades and fins advancing in the direction of flight. During horizontal flight, said rotor blades 13 rotate in the direction indicated by the curved arrow, and said fins 11 provide horizontal thrust by forcing air to move in a direction opposite to the selected direction of flight. Said rotor fins 11, progressively change angle of incidence from the greatest selected angle outward from the rotor hub, indicated in general by numeral 15, when said rotor fins 11 are forward of said rotor hub 15 approximately in the direction of flight of said rotor hub 15, to the greatest selected angle of incidence inward toward said rotor hub when said rotor fins 11 are rearward from said rotor hub and approximately opposite to the direction of flight. From the greatest selected angle of incidence inward, said rotor fins 11 then progressively revert to the greatest selected angle of incidence outward from the rotor hub as they return to a position approximately in the direction of flight of the rotor hub. The fins 11 are in neutral positions and have zero angles of attack when the rotor blades to which they are attached are at approximate right angles to the line of flight. For creating thrust in the direction of flight as illustrated in FIGURE 1, in broken lines at A, a rotor fin is shown in the quadrant of the rotational path where said fins 11 progressively increase angle of incidence outwardly; in broken lines at B a rotor fin is shown in the quadrant of the rotational path where the fins progressively decrease outward angle of incidence in returning to neutral. In broken lines at C a rotor fin is shown in the quadrant of the rotational path where said fins progressively increase angle of incidence inwardly, and in broken lines at D a rotor fin is shown in the quadrant of the rotational path where said fins 11 progressively decrease inward angle of incidence in returning to neutral. At the center of said hub 15 an access cap 16 is shown and on said rotor blades 13, between said fins 11 and said rotor blades, fairings 17 are provided to create flat surfaces adjoining said fins 11 which are also flat on their ends adjoining said fairings 17 (FIGURE 3). Referring now to FIGURE 2, where a body structure is indicated in general by 18, a tail rotor for countering torque of said rotors 13 is indicated at 19, 20 indicates forward landing gear, 21 indicates rear landing gear and 23 indicates a rotor controls housing. Cyclic feather of said fins 11 is brought about by the pilot when he moves his directional control stick 25 in the direction he wishes to travel. When hovering or in vertical ascent or descent, the pilot's directional control stick 25 is held in a neutral position, thus allowing no cyclic feather of said fins 11. Mechanisms well known to those skilled in the art will be suitable to link said pilot's directional control stick to the fin lateral cyclic feather lower torque tube 27, and to the fin fore and aft cyclic feather torque tube 29 (FIGURE 3) to bring about torquing of said torque tubes either separately or simultaneously as desired by the pilot to effect directional control and horizontal thrust of the aircraft.

Lower torque shaft 27 turns in either direction as effected by pilot's directional control stick, and through upper torque tube 31 and bevel gears (not shown) in gear housing 33, torque is transmitted to the jack screw assembly 35. Said jack screw assembly is connected by rod 37 to the cyclic plate assembly, indicated in general by numeral 39 (FIGURE 3), and pushes or pulls the cyclic plate assembly off-center relative to the rotor shaft 41, effecting lateral cyclic feather control of said rotor fins 11 through linkage as will be explained in a later paragraph.

The fin lateral cyclic feather control incorporates an azimuth compensating mechanism that keeps said jack screw assembly 35 at the same relative elevation as cyclic plate assembly 39 at all times, thus preventing lateral cyclic effects when fin collective feather is changed. (Fin collective feather will be described in a later paragraph.) The azimuth compensating lever 43 is actuated by rod 45, when fin collective feather is changed, because of a fixed relationship of rod 45 to fin collective push-pull rod 47 at their lower ends. Said lever 43 pivots about the center line of bolt 49, that attaches said lever to the body structure, and raises or lowers said gear housing 33 and said jack screw assembly 35 through connection to gear housing 33 by links 51.

The up and down movement of said jack screw assembly 35 is kept parallel to rotor shaft 41 by blocks 53 on studs which are integral with gear housing 33. Said blocks 53 slideably fit into slots of stationary brackets (shown in broken lines) which are attached to the fuselage structure. A splined joint linking said upper and lower torque shafts allows upper torque shaft 31 to move up and down with jack screw assembly 35 while lower torque shaft 27 remains stationary.

Through bevel gears (not shown) in the gear housing 55, torque from rod 29 is transmitted to the jack screw assembly 57. The jack screw beam 59 is linked to said cyclic plate assembly 39 by the rods 61 which are articulately attached to said beam and to said cyclic plate assembly (FIGURE 3), and pushes or pulls said cyclic plate assembly off-center relative to said shaft 41, effecting fore and aft cyclic feather control of said rotor fins 11 through linkage as will be explained in a later paragraph.

Though the absence of azimuth compensating linkage such as that employed in the lateral cyclic feather control mechanism allows said cyclic plate assembly to travel in an arc about the points of attachment of rods 61 to the jack screw beam 59, when fin collective feather is changed it is not necessary to incorporate compensating linkage, because the rods can be long enough to make the radius of the arc through which the cyclic plate assembly travels large enough so that the cyclic plate assembly is moved off-center only an insignificant amount when collective feather of the fins is changed. This causes relatively little fore and aft cyclic feather effects of fins which may be cancelled out by a slight movement of the pilot's directional control stick if the fore and aft cyclic feather effects should not be wanted.

Said cyclic control plate assembly 39 consisting of cylinder 63, ring 65, inner bearing seal 67 (FIGURE 6), outer bearing seal 69, bearing 71, bearing retainer plate 73, spring pins 75, yoke 77, locking disc 79 (FIGURE 6), and fitting 81, is attached to the cyclic control universal assembly, indicated in general by numeral 83 (FIGURE 3), by studs 85, which are integral with said ring 65. Said studs protrude outwardly through bearings 87 in yokes 89 (FIGURE 6) at lower ends of the bell crank assemblies indicated in general by numeral 91. Nuts 93 secure said cyclic control plate assembly 39 to said cyclic control universal assembly 83.

Torque is transmitted from cyclic control universal assembly 83 to said ring 65 by the torque springs 95 and 97 which are attached to the spring pins 99 on said cyclic control universal assembly and spring pins 75 which are attached to bearing retainer plate 73. The outer race of said bearing 71 and the retainer plate turns with ring 65.

Said cyclic control universal assembly 83, has a cylindrically shaped trunk 101 encircling said rotor shaft 41, and is concentric with said rotor shaft. An integral flange 103 extends outwardly at the upper end to allow attachment of the internally splined ring 105 by bolts 107; also, integral with the trunk are ears 109 to which webs 111 and fingers 113 are attached by bolts 115.

Each of said bell crank assemblies 91 consists of a pair of L shaped plates 117, between which are said yokes 89, each of which houses said bearing 87. Bearings 119 are in said plates 117 to provide pivotal mountings for said yokes 89. Bolts 121, extending through bridges 123, spacers 125 and said plates 117, hold said bell crank assemblies 91 together.

Said bridges 123 are of hard material and are polished in the area of contact with said torque springs 95 and 97 to resist wear from the slight pivoting action of the said torque springs when fin cyclic feather control is applied.

Torque from said rotor shaft 41 is transmitted to cyclic control universal assembly 83 by contact of internally splined ring 105 with the splined sleeve 127 which is fitted between said rotor shaft 41 and the lower end of the rotor hub mast 129 and is held in position by bolts 131.

When fin cyclic feather control is actuated, the "off-center" movement of said cyclic control plate assembly 39, causes said bell crank assemblies 91, to pivot at 133 (FIGURE 6) and push rods 135 up on the side in the direction of movement off-center of cyclic control plate assembly 39 and to pull rods 135 down on the opposite side.

Therefore, as said cyclic control universal assembly 83 (to which rods 135 are attached) rotates, a vertical push-pull action is transmitted by said rods 135 to the outer ends of the horizontal legs of the bell cranks 137 (FIGURE 5), located in said rotor hub 15. Said bell cranks 137, are pivotally attached to fittings 139 by bolts 141, and said fittings are attached to said rotor hub mast 129 by bolts 143 that also attach said rotor hub to said rotor shaft 41. Inserts 145 (FIGURE 6) provide seats for heads of said bolts 143 and 131 and distribute stress loads. A back and forth movement, approximately in line with the pivot axis of the rotor blade torque arms 147 (FIGURE 5) is transmitted by the upper ends of the vertical legs of said bell cranks 137, to levers 149 by links 151 (FIGURE 4). Said levers pivot at their points of attachment by bolts 154 to horns 153 (which extend from said torque arms 147, opposite to the direction of rotation of said rotor hub), as their opposite ends move back and forth approximately in line with the pivot axis of said rotor blade torque arms 147. Push-pull rods 155 are pivotally attached to said levers 149 between points of attachment of said levers 149 to said links 151 and to said horns 153 and extend outwardly parallel to said torque arms 147 through elongated holes in said horns to points of pivotal attachment to cross beams 157. Said cross beams 157 are comprised of identical upper and lower halves that are held at fixed relationships by bolts 158 that also provide pivotal attachment of said push-pull rods 155 and cables 159. Extending upward and downward from the sleeves 160, which are integral parts of said horns 153, are studs 161 that provide pivotal attachments for said cross beams 157.

The "back and forth" action of said bell cranks 137 is transmitted by said links 151, to said levers 149, and from said levers a see-saw action is transmitted to said cross beams 157 by said push-pull rods 155 and the see-saw action is transformed by said cables 159, through connection of said cables to fin structural members 162 (FIGURE 3), to a back and forth pivot, or cyclic feather movement, of said fins 11. Identical upper and lower spindles 163 (FIGURE 3) which are bolted together by bolts 164 provide pivotal attachment of said fins 11 to rotor blade spars 165 without obstructing opening through said spars 165. Bearings 166 and 167 are provided on said upper and lower spindles 163 to reduce friction as said fins 11 pivot back and forth on said spindles. Said structural members 162 extend from upper end of said upper fin 11 downward through said fairings 17 and said rotor blade 13 and terminate at the lower end of said lower fin 11. Slots in said fairings 17 and said blades 13 provide clearance for said structural members 162 to move back and forth as said fins 11 change angle of incidence.

Though fin cyclic feather and fin collective feather may be actuated either separately or simultaneously, it should be understood that fin cyclic feather principally effects horizontal movement of the aircraft, and fin collective feather principally effects the lift of the aircraft whether separately or simultaneously actuated.

Figure 6:
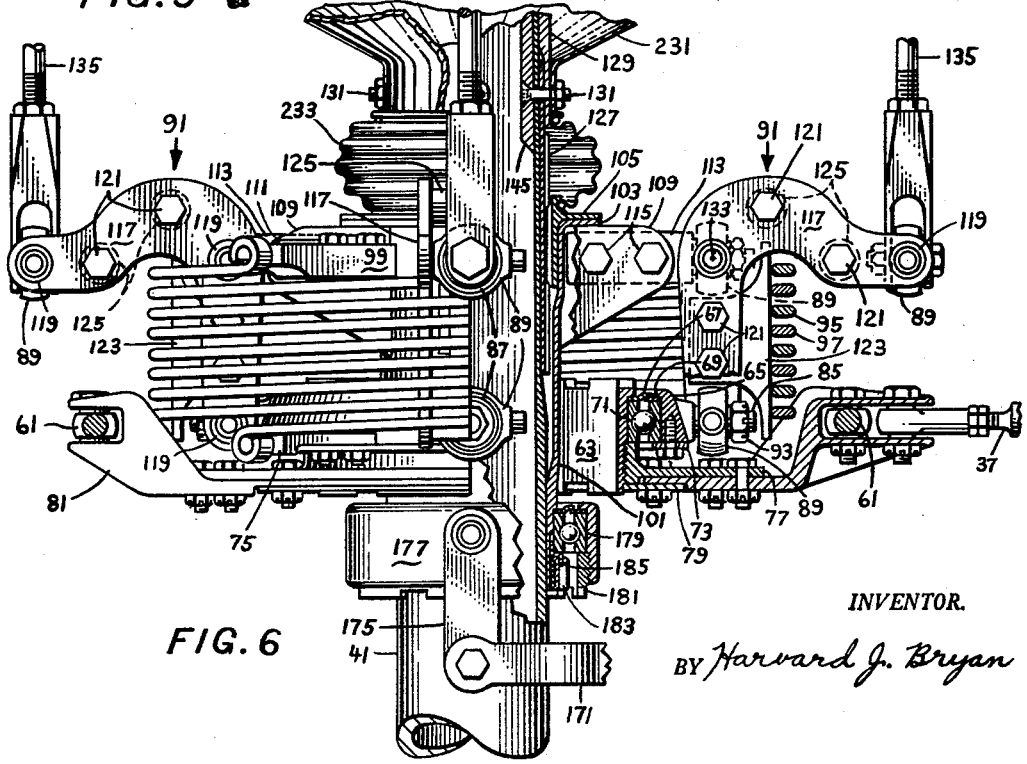
FIGURE 6 is a fragmentary view of the cyclic control universal assembly and the cyclic control plate assembly.

Collective feather of said fins 11 is brought about by the pilot when he moves the fin collective feather control lever 167 (FIGURE 2) to select the desired amount of fin pivot-out or pivot-in with respect to leading edge of fin 11. Said control lever 167 is linked to said fins 11 in a manner to cause leading edge of said fins to pivot outward when control lever 167 is moved aft and to pivot inward when said control lever is moved forward. Conventional means well known to those skilled in the art will be suitably employed to cause movement of said control lever to actuate jack screw 168 by connection of cable 169 (FIGURE 3) to move said push-pull rod 47 up or down, thus providing the necessary actuation of the mechanisms relating to the collective feather control of said fins 11. The antitorque scissor 170 is employed to prevent torquing of said rods 47 and 45. The up and down movement of said rod 47 is transmitted to the lever 171 by pivotal connection to said lever. Said lever pivots about the center-line of bolt 173, that attaches said lever 171 to the body structure, and raises or lowers said cyclic control universal assembly 83 by pivotal connection of links 175 to studs that are integral with yoke 177. Said yoke 177 attaches to the outer race of bearing 179 (FIGURE 6). Said bearing 179 is retained in said yoke 177 by retainer ring 181 and the inner race of said bearing 179 is attached to the lower end of said trunk 101 of said cyclic control universal assembly 83 by nut 183 and is safety locked by lock ring 185. Link 187 attaches to said gear housing 33 and to said stud of said yoke 177 to resist torque from outer race of said bearing 179 as the inner race of said bearing turns with said cyclic control universal assembly 83.

By pivotal connection of said rods 135 to said bell crank assemblies 91 the raising or lowering of cyclic control universal assembly 83 causes the upper ends of said bell cranks 137 to transmit movement inward toward the axis of rotation of said rotor shaft or outward toward said fins 11, thus changing angle of incidence of said fins by unified linkage of said links 151 (FIG. 4), said levers 149, said rods 155 and said beams 157, forcing said beams to pivot about said studs 161, and effect collective feather of said fins 11 by connection of said cables 159 to said structural members 162 in said fins 11.

Though the principal function of said rotor blades is to provide lift of the aircraft, they also serve as arms for mounting said fins 11. Collective pitch changing of said rotor blades 13 may be accomplished without changing setting of collective feather or cyclic feather of said fins 11.

Figure 5:
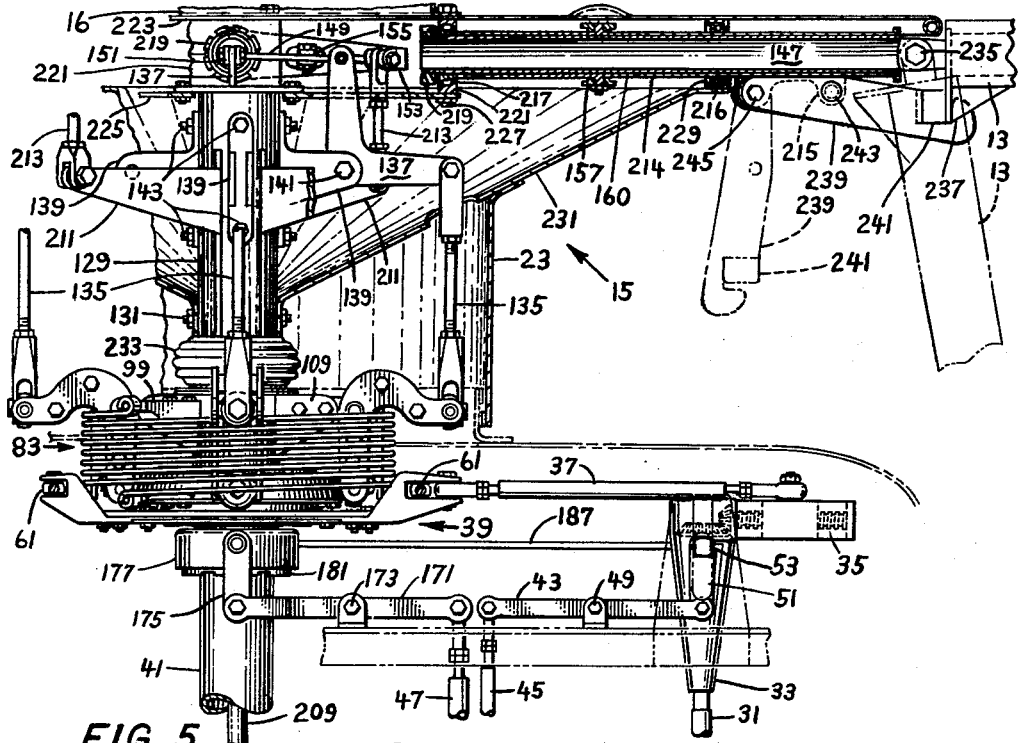
FIGURE 5 is a partial elevational view looking aft, and in broken lines, a rotor blade and its locking mechanism is shown folded downward.

Collective pitch of said rotor blades 13 is controlled by the pilot as he selects the desired degree of pitch of said rotor blades, by moving the rotor blade collective pitch control stick 189, (FIGURE 2). The pitch, or angles of attack, of said rotor blades increases in an attitude to create lift when said rotor blade collective pitch control stick 189 is moved aft, and, when said rotor blade collective pitch control stick is moved forward, the angles of attack of said rotor blades decreases. Conventional means will be suitably employed to cause the rod 191 (FIGURE 3) to move up or down as necessary to effect collective pitch of said rotor blades 13. Said rod 191, being pivotally attached to lever 193, forces said lever to pivot about the center-line of the bolt 195 that attaches said lever to link 197 as it raises or lowers yoke 199 by pivotal connection to the studs that are integral with said yoke. Said link 197 is pivotally connected to the body structure by bolt 201. Said yoke 199 houses the outer race of the bearing 203 that is secured in said yoke and the inner race of said bearing is forced to turn with ring 205 that is attached to beam 207. Scissor link 208 prevents torquing of said lever 193. Said beam 207 extends through slots in said rotor shaft 41 and is fixed to the lower end of rod 209. Said rod 209 extends upward from place of attachment of said beam 207, inside said rotor shaft 41, and transmits an up or down movement to the pivotal point of attachment to the spider fitting 211. The up and down movement of said spider fitting 211 transmits torque to said rotor blade torque arms 147 by said horns 153 that are pivotally connected to said spider fittings 211 by links 213 (FIGURE 5). Said sleeves 160 that are integral parts of said horns 153 are notched at their outward ends to mate with notches in sleeves 214 which are integral with fittings 215 and said torque arms 147. Said rotor blade torque arms are mounted on said rotor hub 15 in a manner to permit pivoting about their lengthwise axes by bearing 216 which is subject to radial loading only, and thrust bearing 217 which carries the centrifugal force load of said rotor blade 13 and said fins 11 when they are rotating, plus the thrust of said fins when said fins are positioned to pull outward, and minus the thrust of said fins when said fins are positioned to exert thrust inward. The outer races of said bearings 216 and 217 are fixed relative to said rotor hub 15 and the inner races of said bearings 216 and 217 turn back and forth with said rotor blade torque arms 147 as collective pitch of the rotor blades changes. Said rotor blade torque arms are attached to said rotor hub assembly 15 by nuts 219.

The inner bearing housing 221 (FIGURE 4) consists of identical upper and lower halves. Said inner bearing housings attach to the upper disc 223 and to the lower disc 225 by the bolts 227. The outer housings 229 attach to said upper disc 223 and near outer diameter of cone 231. The inner diameter of said lower disc 225 attaches to the top end of said rotor hub mast 129. The inner diameter of said cone 231 is joined to the lower end of said mast 129 by said bolts 131.

Boot 233 attaches to the lower end of said mast 129 and to said ring 105 to keep foreign matter from interfering with sliding action of said splined sleeve 127 in said internally splined ring 105.

Slots in the upper end of said rotor shaft 41 and in the lower end of said mast 129, that are provided to admit arms of said spider fitting 211, allow expansion of said rotor shaft and contraction of said mast when said bolts 131 and 143 are tightened. This insures a good fitting together of said rotor hub 15 and said shaft 40 without close tolerance machining.

Said rotor blades 13 are attached to said rotor blade torque arms 147 by bolts 235 that are aligned in said fittings 215 and fittings 237 to allow pivoting about the center-line of said bolts so that said rotor blades may be folded downward or upward. Said fittings 237 are integral with said spars 165. The links 239 hook to said fittings 237 (FIGURE 5) and restrict upward hinging of rotor blades 13, and hard rubber-like stop 241 restricts downward hinging of rotor blades while providing cushioned rests for said rotor blades. When the pins 243 are pulled from aligned holes in said fittings 215 and said links 239, said links will pivot about the center-line of attaching bolts 245 and hang free, permitting said rotor blades to fold downward pivoting about the center-line of said attaching bolts 235. This facilitates removal, attachment, or stowage of said rotor blades.

It should be noted here that on certain types of rotary winged aircraft it will be feasible to install this control system rotated approximately 90 degrees with respect to forward on the aircraft from what is referred to as forward in this application. Rotation of this control system 90 degrees with respect to the aircraft would cause what is referred to here as the lateral cyclic feather control to become the fore and aft cyclic feather control and the fore and aft cyclic feather control referred to here would become the lateral cyclic feather control.

To those skilled in the art, it will be obvious that many variations and modifications of the present invention are possible in the light of the above teachings, therefore I wish not to be limited in this invention to the specific details herein set forth but wish to reserve any variations, modifications or mechanical equivalents that fall within the scope of the following claim.

I claim:

A control mechanism for rotary winged aircraft having a rotor shaft with rotor blades mounted thereon, a cylindrical central trunk member concentric with and axially movable external of the rotor shaft, an externally splined sleeve connected with the outer surface of said shaft for transmitting torque to an internally splined ring connected with said trunk, a plurality of identical bell-cranks connected with said trunk to pivot about axes radial of said trunk, each of said bell-cranks being pivotal also about axes perpendicular to and intersecting said radial axes, one of the two legs of each of said bell-cranks extending from point of attachment of said bell-cranks with said trunk parallel to said trunk and the other leg extending radial of said trunk when said controlling mechanism is not actuated, a plate comprising a nonrotatable portion concentric with a rotatable portion which is joined in a universally pivotal manner with said parallel legs of said bell-cranks, said plate being concentric with said trunk when said controlling mechanism is not actuated and having a circular opening concentric with said trunk and of greater diameter than said trunk to permit moving said plate off center for actuation of said controlling mechanism, spring-like members spiraling collectively around parallel legs of said bell-cranks from points of attachment with said trunk to points of attachment with the rotatable portion of said plate to transmit torque from said trunk to rotatable portion of said plate, and to stabilize said mechanism in a neutral position.

References Cited by the Examiner

UNITED STATES PATENTS

| | | | |
|---|---|---|---|
| 1,361,785 | 12/20 | Tucker | 170—160.12 |
| 1,519,866 | 12/24 | Marchetti | 170—160.25 |
| 1,885,640 | 11/32 | Strandgen | 170—15 X |
| 2,068,617 | 1/37 | Wilford et al. | 170—160.12 X |
| 2,410,963 | 11/46 | Chappedelaine | 170—160.25 |
| 2,808,116 | 10/57 | Kapelski | 170—160.12 X |
| 2,818,122 | 12/57 | Johnston | 170—160.25 X |
| 2,845,132 | 7/58 | Heckman | 244—17.25 X |
| 2,886,260 | 5/59 | Peterson | 170—160.12 X |
| 2,994,384 | 8/61 | Stevens | 244—17.19 X |

FOREIGN PATENTS 446,509    4/36    Great Britain.

JULIUS E. WEST, *Primary Examiner.*

MILTON BUCHLER, *Examiner.*